United States Patent [19]
Tognazzini

[11] Patent Number: 5,703,591
[45] Date of Patent: Dec. 30, 1997

[54] AIRCRAFT N-NUMBER CONTROL SYSTEM

[75] Inventor: Bruce Tognazzini, Woodside, Calif.

[73] Assignee: Sun Microsystems, Inc., Mountain View, Calif.

[21] Appl. No.: 657,262

[22] Filed: Jun. 3, 1996

[51] Int. Cl.$^6$ .................................................. G01S 13/00
[52] U.S. Cl. ............................. 342/30; 342/38; 342/36; 342/176; 364/439
[58] Field of Search .................. 342/182, 36, 176, 342/30, 38; 364/439

[56] References Cited

U.S. PATENT DOCUMENTS

| | | | |
|---|---|---|---|
| 4,162,494 | 7/1979 | Bacon | 342/182 |
| 5,025,382 | 6/1991 | Artz | 364/439 |
| 5,227,786 | 7/1993 | Hancock | 342/29 |

*Primary Examiner*—J. Woodrow Eldred
*Attorney, Agent, or Firm*—Lowe, Price, LeBlanc & Becker

[57] ABSTRACT

An aircraft N-number control system includes a receiver for receiving aircraft identification information signals representing alphanumeric characters corresponding to an aircraft. A microprocessor operating in accordance with stored programming instructions processes the received aircraft identification information signals into alphanumeric codes, determines whether there is a substantial similarity between the alphanumeric codes representing two aircraft and generates an output signal representing the alphanumeric codes only if there is no substantial similarity. The alphanumeric codes representing the aircraft are displayed on a air traffic controller's radar screen in response to the output signal.

35 Claims, 6 Drawing Sheets

AIRCRAFT N-NUMBER CONTROL SYSTEM

BACKGROUND OF THE INVENTION

1. Field of the Invention

The invention relates generally to traffic control systems and methods. More particularly, the present invention relates to systems and methods for avoiding confusion when using an aircraft registration number for communications and for display on a radar screen.

2. Description of the Related Art

Collision avoidance is a general problem in the operation of virtually any traffic control system. The problem is particularly acute in the aviation industry. This is in part because of the fact that any collision between aircraft can result in a significant loss of life. At present, pilots partially rely on verbal communication with an air traffic controller (ATC) to avoid collisions. Near misses occur regularly due to human error.

Known air traffic control systems track aircraft on the radar screen of an air traffic controller (ATC). Computers in a centralized control station display the location of aircraft on the radar screen using each aircraft's registration number. The first character of a U.S. aircraft's registration number is always "N" and therefore is commonly referred to as its "N-number". Although the term "N-number" is used throughout this application, it refers to any and all alphanumeric aircraft registration numbers.

At the option of the air traffic controller, the N-numbers appearing on the radar display screen can be truncated to the last three alphanumeric characters. For example, a registration number of "N566DC" would be shortened to "6DC". This truncation is typically done for convenience in speaking and in order to reduce the amount of congestion and overlap which frequently occurs when a large number of N-numbers are displayed on the radar display screen.

However, the probability of errors by an air traffic controller reading the N-numbers increases if the last three characters of different aircraft are sequentially similar (i.e., "556" and "566") or dyslexically similar (i.e., "647" and "467").

Furthermore, the use of truncation may implicitly indicate that a pilot has been in communication with an air traffic controller. For example, the full N-Number is used exclusively in the first radio contact between a pilot and the air traffic controller and the truncated N-number is normally used in all subsequent radio contacts. A pilot may thus cause confusion by using the full N-number when he is expected to use the truncated N-number or by using the truncated N-number when they are expected to use the full N-number.

Thus, confusion may occur because of a misunderstanding or miscommunication of the truncated N-number resulting in the wrong aircraft executing an aircraft controller's instructions with its attendant increased risk of collision.

SUMMARY OF THE INVENTION

The present invention provides a novel air traffic control system and method which prevents confusion caused by the use of truncated N-numbers in identifying an aircraft. A key feature of the method is that it flags aircrafts which are represented by identical, similar, or similar sounding truncated N-numbers.

In accordance with the present invention, an aircraft N-number control system includes a receiver for receiving aircraft identification information signals representing alphanumeric characters corresponding to an aircraft. A processor, such as a micro-processor operating in accordance with stored programming instructions, is provided to process the received aircraft identification information signals into alphanumeric codes, to determine whether there is a substantial similarity between the alphanumeric codes representing two aircraft and to generate an output signal indicating use of truncated alphanumeric codes only if there is minimal risk of confusion. Responsive to the output signals the alphanumeric codes representing the aircraft can be displayed on a air traffic controller's radar screen in a way which indicates that either a truncated or a full N-number should be used.

The system may be automated and perform processing of aircraft identification information signals as soon as they are received. Alternatively, the system may comprise a touch screen display and be responsive to actions taken by an air traffic controller on the touch screen display. In that case, the processor then preferably determines whether there is a substantial similarity between the alphanumeric code representing an aircraft the first time the air traffic controller touches the aircraft's location or alphanumeric code on the touch screen display. The processor compares the subject alphanumeric code with the other alphanumeric codes already received and determines that there is substantial similarity between the codes if they are either sequentially, dyslexically or phonetically similar. Depending on the results of the comparison, the display of the code may flash, change color, change brightness, etc., to indicate the result of the comparison.

The system may also receive position information signals representing the relative position of aircraft in a region of air space. In such cases, the processor correlates the alphanumeric codes with the position of the aircraft and the alphanumeric codes are displayed at a position on the display corresponding to the aircraft's relative position.

The system according to the present invention is preferably responsive to an air traffic controller actions and indications regarding clearance and makes the air traffic controller's actions and indications explicitly known to the pilot without the need for verbal communication, thereby reducing confusion to different aircraft with similar N-numbers. The display attribute on the air traffic controller's screen corresponding to an aircraft is then transmitted to that aircraft by a transceiver at the air traffic control station. A receiver in the aircraft receives the transmission and changes a display in the aircraft to be the same as that on the air traffic controller's display. The displays may also be changed if it is detected that the air traffic controller or the pilot has switched to a different radio frequency.

The advantages and novel features of the present invention will become apparent to those skilled in the art from this disclosure, including the following detail description, as well as by practice of the invention. While the invention is described below with reference to preferred embodiments, it should be understood that the invention is not limited thereto. Those of ordinary skill in the art having access to the teachings herein will recognize additional applications, modifications and embodiments in the same or other fields, which are within the scope of the invention as disclosed and claimed herein and with respect to which the invention could be of significant utility.

NOTATION AND NOMENCLATURES

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DETAILED DESCRIPTION OF THE PREFERRED EMBODIMENTS

Figure 1:
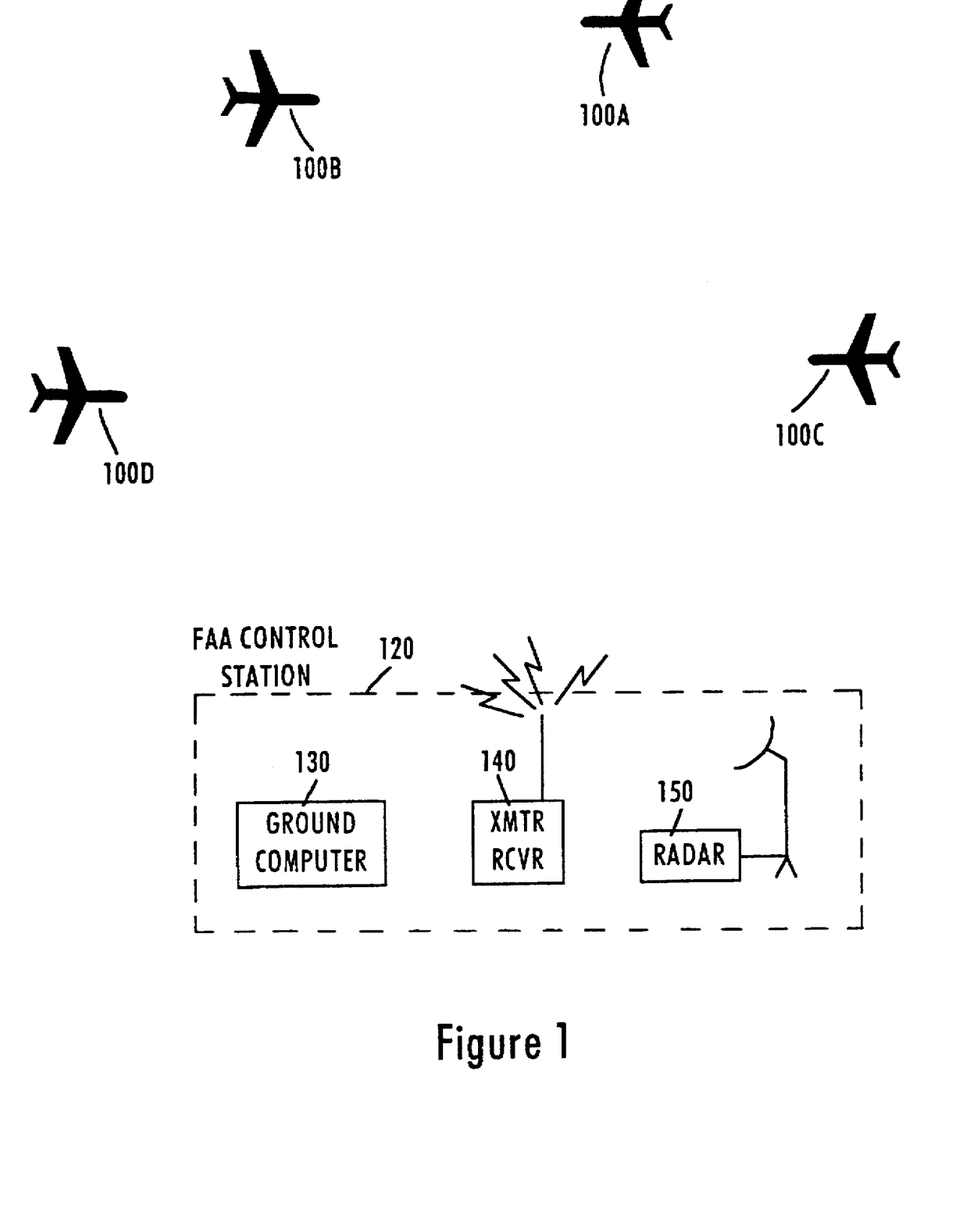
FIG. 1 is an exemplary block diagram of a central air traffic control station forming a part of the air traffic control system and method in accordance with the present invention.

The aircraft N-number control system in accordance with the present invention will now be described with reference to FIG. 1, which is a block diagram of a centralized air traffic control system. As indicated above, the air traffic control station 120 tracks all of the aircraft in a particular vicinity on the radar screen of an air traffic controller (ATC) at the centralized control station. The vicinity may be as large as perhaps 200 square miles or more and the number of aircraft, N, tracked simultaneously may be great. Four aircraft $100_1$, $100_2$, $100_3$ to $100_N$ are shown in FIG. 1 for purposes of illustration. Each one of the aircraft has a transponder (not shown) which automatically responds to contact by the centralized control station by giving the altitude of the aircraft and the aircraft's N-number.

A large, high-powered computer or a number of computers are present in the centralized air control station to process large amounts of information from the aircraft, including the altitude and N-number transmitted by each aircraft's transponder. The computer(s) are shown as a single ground computer 130 in FIG. 1 merely for the sake of convenience. Radio transmitter/receiver 140 provides radio contact between air control station 120 and transceivers in the aircraft $100_1$, $100_2$, $100_3$ to $100_N$. Radar station 150 detects the position of aircraft $100_1$, $100_2$, $100_3$ to $100_N$ and generates radar signals containing information about the azimuth and distance of the aircraft from the radar station. The radar signals for each aircraft are received by ground computer 130.

Figure 2A:
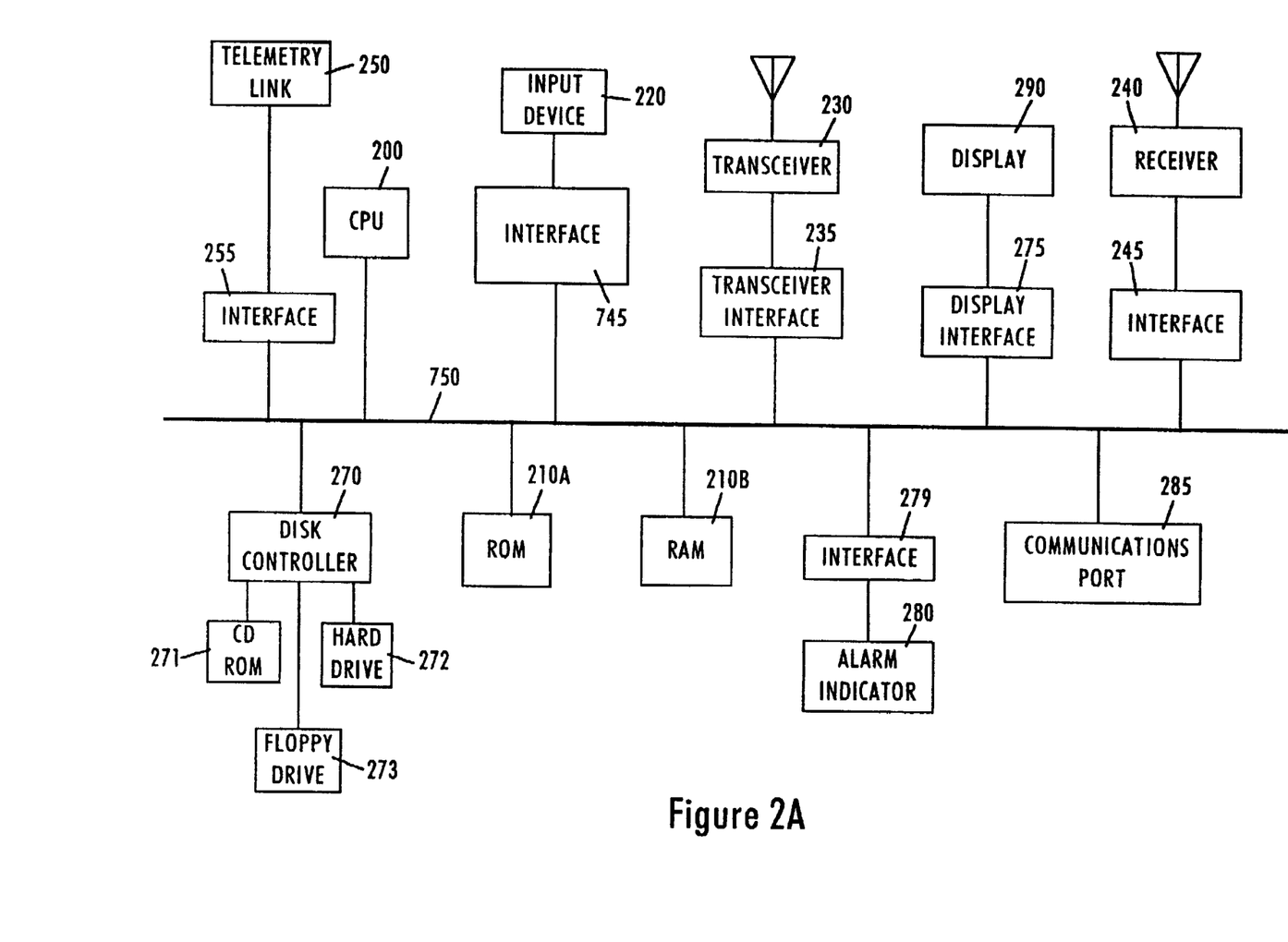
FIG. 2A is a block diagram of a computer used in the air traffic control system and method in accordance with the present invention.

As shown in FIG. 2A, ground computer 130 additionally has a telemetry link 250 which receives information from the transponders of aircrafts indicating at least the altitude and the N-numbers of the aircrafts. The information is forwarded to bus 750 of ground computer 130 via interface 255. The ground computer 130 may additionally have a receiver 240 which receives GPS or other signals transmitted from individual aircraft indicating the global position of at least some of the aircraft $100_1$, $100_2$, $100_3$ to $100_N$. These can also be forwarded to bus 750 of ground computer 130 via interface 245. It is important to note that receiver 240 in air control station 120 does not detect the signals emitted from GPS satellites and is not a conventional GPS receiver. It is instead a wireless communications system used specifically for receiving GPS signals developed by GPS receivers located in aircraft and then transmitted to GPS receiver 240 by a transmitter in the aircraft. It is preferable that GPS receiver 240 be separate from transmitter/receiver 140 so as to avoid overloading channels intended for verbal communication between pilots and air traffic controllers and to allow a modular approach in adding GPS capabilities to air control station 120.

The ground computer 130 displays the location of each aircraft on display 290 via a display interface 275 using the radar signals generated by radar station 150 and/or the signals received from the aircraft by receiver 240. A central processing unit (CPU) 200 in ground computer 130 is operatively connected to memory devices 210A and 210B, namely read-only memory (ROM) 210a and random access memory (RAM) 210b. ROM memory 210a typically stores BIOS and operating system like information. Programming which instructs the CPU 200 to operate in accordance with the present invention as will be described in detail below may be stored in ROM or RAM. Data and information received or generated by the CPU 200 can be preferably stored in RAM 210b. Memory devices such as hard or floppy disk 273, SRAM, DRAM, optical memory 271, etc., could be utilized in lieu of ROM and RAM memory depicted, as is well understood by those of skill in the art. The CPU 200 is also operatively connected to input device 220 which could be a key pad, key board, dial or virtually any other device which would facilitate the input of data, of the type described below, to the CPU 200 by personnel at the air traffic control station 120.

The transceiver 230 allows communications to be transmitted to and received from each one of the aircraft $100_1$, $100_2$, $100_3$ to $100_N$. The communication signals from each aircraft include alphanumeric data indicating the N-number of that respective aircraft. The transceiver 230 is connected to an antenna and to the CPU 200. An alarm indicator 280 is beneficially connected to the CPU 200. The alarm indicator 280 may be an audio, visual or audio/visual indicator. It may include a beeper, siren, light source and/or other aural or visual alarm indicator. In a more sophisticated version of the collision avoidance system of the invention, the alarm indicator 280 includes a voice synthesizer which is driven by the CPU 200 in accordance with the stored program instructions to generate synthesized voice signals.

The equipment in the aircraft may constitute a computer which is either similar to or different than the ground computer 130 shown in detail in FIG. 2A, although it must have bidirectional communication capabilities analogous to ground computer 130 and a transponder 260 with an associated transponder interface 265. In the exemplary aircraft computer system shown in FIG. 2B, hardware elements which are the same as those in the air traffic control station shown in FIG. 2A are represented by identical numerals. However, it is to be understood that the elements are controlled to operate in a different manner as described below.

Figure 2B:
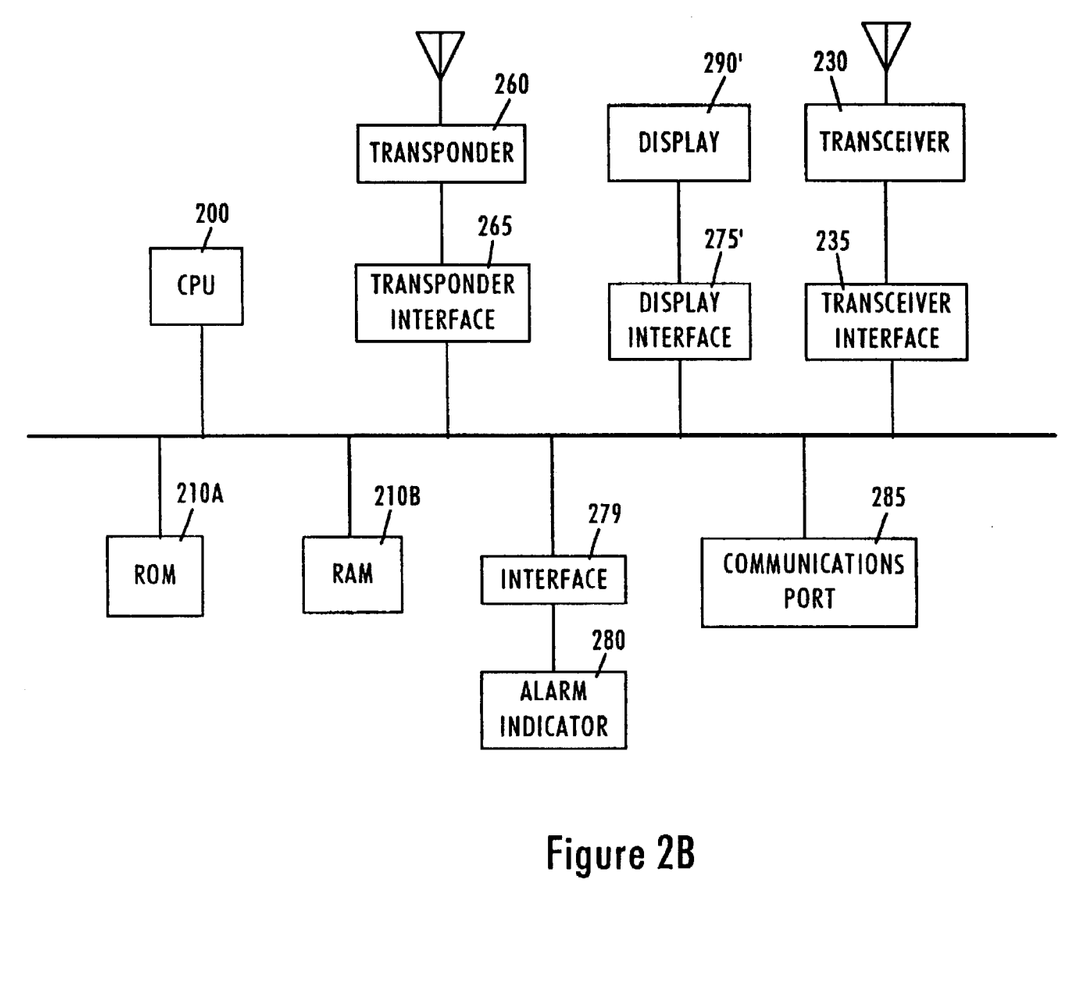
FIG. 2B is a block diagram of an exemplary aircraft computer system used in the air traffic control system and method in accordance with the present invention.

The display 290' in the aircraft differs from display 290 in the air control station 120. It is preferably an alphanumeric illuminating electronic display or a back-lit white-on-black plastic or paper display of the numbers. The construction of display 290' is not essential so long as it can be controlled via display interface 275' to perform the same truncation, modifications, supplement, replacement, etc., of the N-number as display 290 of ground computer 130. For this reason, although the colors selected for use in a system according to the invention are somewhat arbitrary, they are preferably selected to be colors likely to be easily duplicated by a display in a crowded cockpit (i.e., red and green are easily generated by a light emitting diode (LED).

Figure 3:
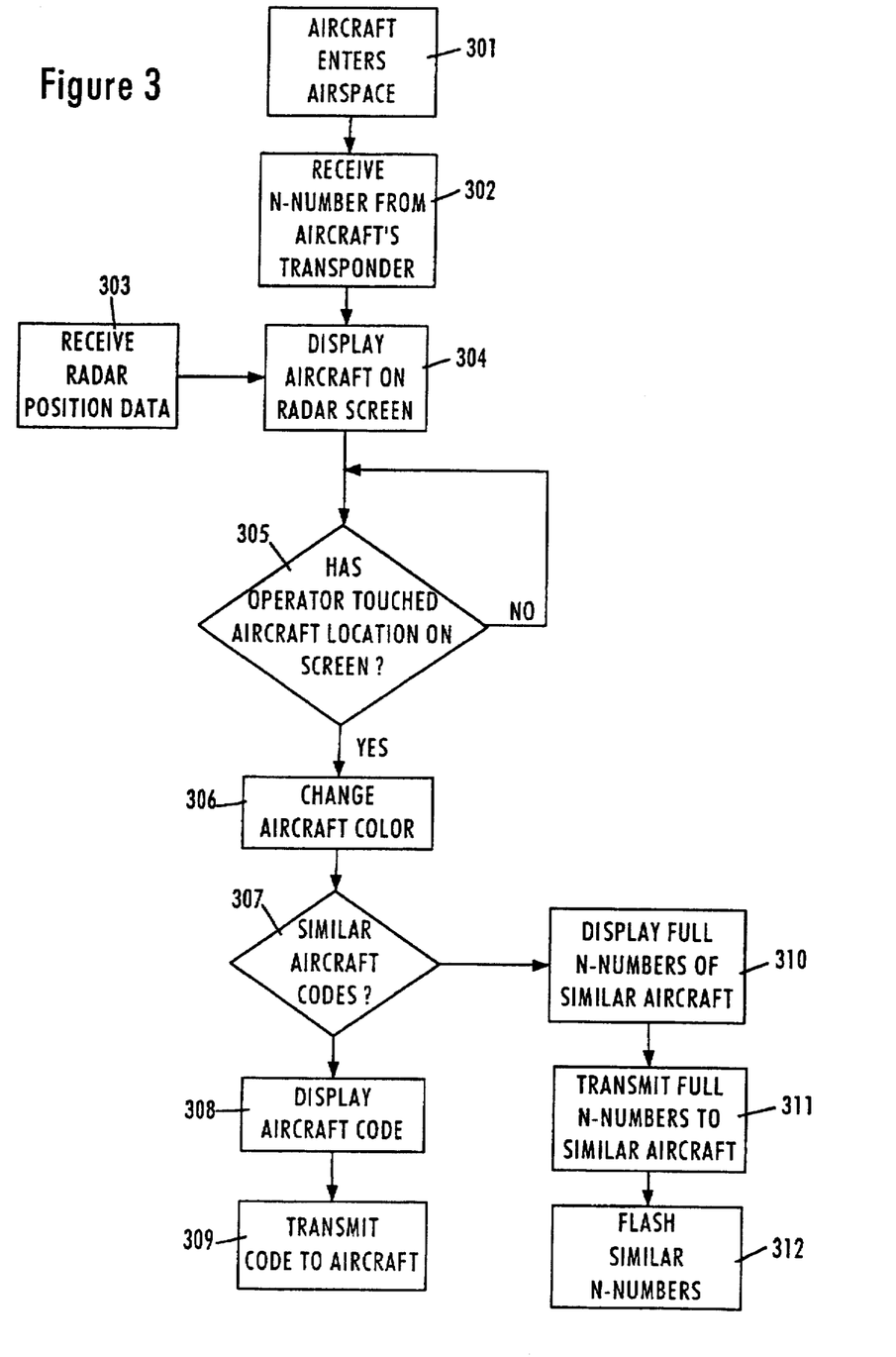
FIG. 3 is a flowchart of the air traffic control method in accordance from the perspective of an air traffic control station in a preferred embodiment of the present invention.

FIG. 3 is a flow chart showing an aircraft N-number control method according to the present invention as viewed from the perspective of the air traffic controller. In step 301, an aircraft enters the airspace of air traffic control station 120. Telemetry link 250 of air traffic control station 120 activates the aircraft's transponder and receives a response which includes the aircraft's altitude and full N-number (step 302). (Alternatively, alphanumeric data indicating the N-number of each aircraft can be received from transceiver 230 or elsewhere.) In step 303, ground computer 130 receives position data from radar station 150 and/or receiver 240 for each aircraft. The ground computer 130 then displays the aircraft on display screen 290 in a predetermined color at the location corresponding to the radar position data and labeled with the full N-number (step 304).

In the embodiment illustrated in FIG. 3, display 290 is a touch screen display and is configured to indicate when a pilot of an aircraft has had contact with the air traffic controller. When the air traffic controller touches the location of said display screen corresponding to said N-number or a dot representing the aircraft (step 305), the display of the aircraft then changes color to show the contact (step 306). At that point, CPU 202 compares the truncated code corresponding to the N-number with every other previous truncated alphanumeric code to determine if it is confusingly similar to any of them (step 307).

If the truncated code is not confusingly similar to any one of the other previous codes, the displayed N-number is truncated (step 308) and ground computer 130 sends a data transmission corresponding to the truncated code being modified to the transceiver 230 located inside the affected aircraft or over a dedicated radio channel. The receiving element inside the aircraft is connected to and controls the alphanumeric display 290' of the aircraft's N-number through the computer. The data transmission includes information signals indicating the truncated code of the aircraft's N-number to be displayed on the display 290 at the air control station 120. The transceiver 230 receiving the information signals controls the aircraft's display 290' so it has the same color and truncated code as the display of the aircraft's N-number on display 290. When the air traffic controller, for example, touches the screen at the location of the aircraft on display 290 (step 305), thereby changing the N-number colors (step 306), any color change will be transmitted substantially simultanously to the corresponding aircraft causing the display in the aircraft to mimic display 290 at air control station 120. The system thereby ensures that the pilot of the aircraft and the air traffic controller have the same understanding of whether to use the truncated or full N-number, which in turn may implicitly indicate the aircraft's clearance and any other instructions.

If the truncated code is confusingly similar to at least one of the previous codes, the full N-number continues to be displayed on display 290, the display of the truncated code for each one of the aircraft which may be confused is changed to its corresponding full N-number (step 310), a data transmission is sent to each pilot's display so that it matches the display of screen 290 (step 311), and/or both full N-numbers on display 290 and 290' are flashed for a few seconds. This embodiment is advantageous because the first touch by the operator can be performed simultaneously with the first radio contact and the different color can thus show the operator which aircraft he has had contact with and which ones he has not had contact.

Although not shown in FIG. 3, CPU 200 controls many of the functions in the process. For example, CPU 200 processes the alphanumeric data making up each aircraft's full N-number to obtain a corresponding alphanumeric code in accordance with a software program stored in memory, such as ROM 210A, and stores the code in RAM 210B. Preferably, CPU 200 simply truncates the data to obtain a code consisting of only the last three alphanumeric characters of the data. These steps may be carried out immediately upon receipt of the N-number, with both the original alphanumeric data and its associated truncated alphanumeric code stored in RAM 210B for later processing, or as part of the step for determining whether the truncated codes are similar (step 307).

Figure 4:
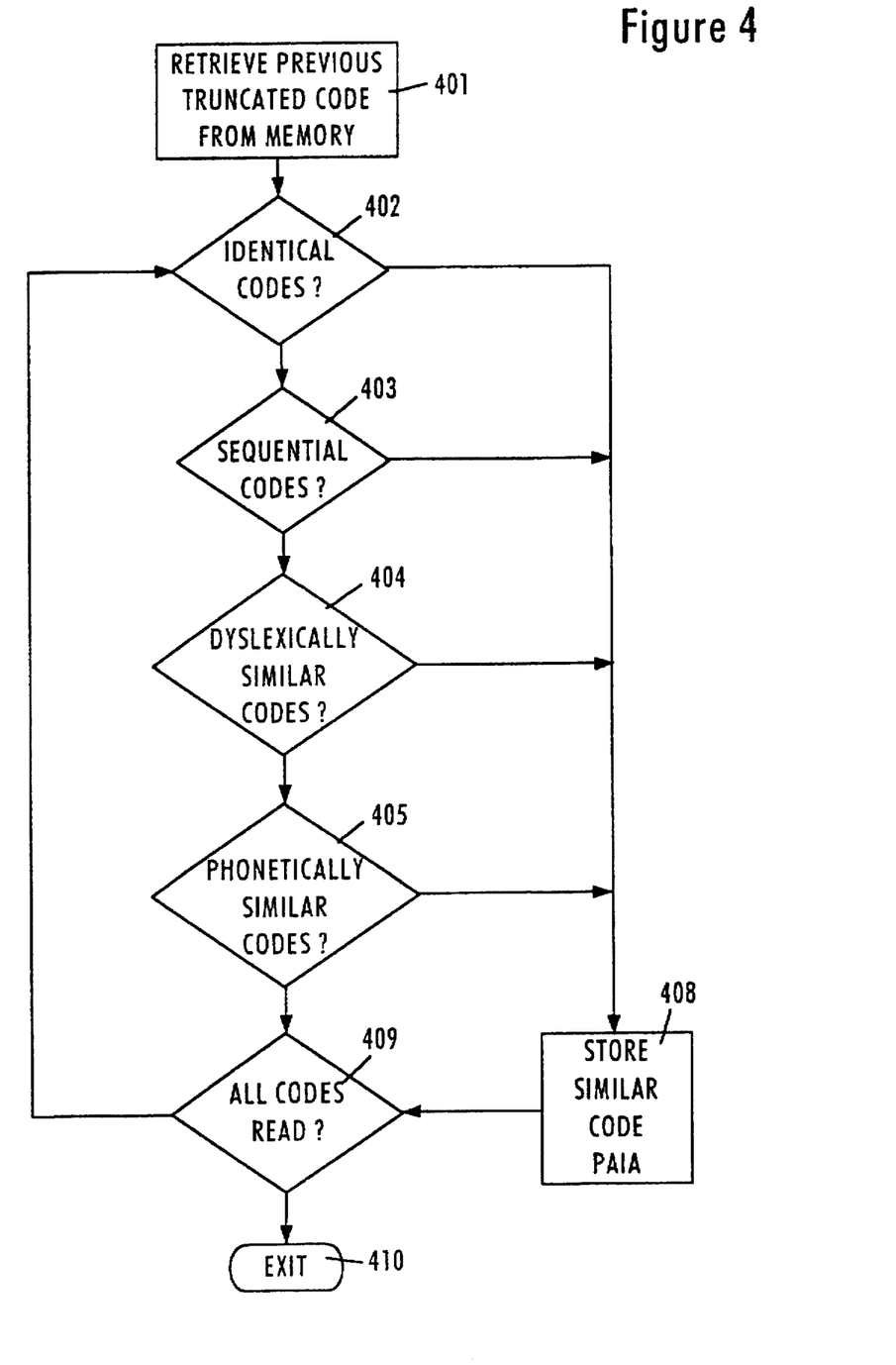
FIG. 4 is a flowchart of a subroutine performed by the CPU of the air traffic control station in the preferred embodiment of the present invention.

The CPU 200 also controls the step of determining whether a truncated alphanumeric code is similar to other previous codes (step 307) in accordance with a software program stored in memory such as ROM 210A. An simplified flowchart of the steps carried out by the program is shown in FIG. 4. In the first step, CPU 200 retrieves the truncated code corresponding to a previous one of the aircraft from RAM 210B (step 401). The previous truncated code is then compared with the present truncated code to determine if it has the identical three characters (step 402). If it does, then the previous code is designated as a similar code in step 408 and stored in RAM 210B.

Next, if all of the previous codes have not been read (step 409), then the subroutine returns to step 401 and another one of the previous codes is read out of RAM 210B. If however the three characters are not identical, then it is next determined whether the previous truncated code is sequentially similar to the present truncated code (step 403). If the previous truncated code is sequentially similar, then previous code is designated and stored in RAM 210B in step 408. An example of potential confusion arising from sequentially similar truncated codes would be "566" and "556." If the codes are not sequentially similar, it is next determined whether the previous truncated code is dyslexically similar to the present truncated code (step 404). An example of potential confusion arising from dyslexically similar truncated codes would be "428" and "482." If the previous truncated code is dyslexically similar, then the previous code is designated as being confusingly similar and stored in step 408. If not, it is next determined whether the previous truncated code is phonetically similar to the present truncated code (step 405) in a similar manner. An example of potential confusion arising from phonetically similar truncated codes would be "35D" and "45T." It can be seen from FIG. 4 that a previous truncated code need to be similar in only one criteria in order to be considered likely to cause confusion. When all of the previous codes have been read, then step 409 does not return the process to step 401.

The determination of the differences between two truncated codes which are significant enough to be capable of causing confusion in FIG. 4 can be predetermined for each criteria and the pairs of confusing truncated codes stored in a look-up-table or other memory and comparison can be carried out by simply referred to the stored compilation of confusing truncated codes. Alternatively, the software program can have parameters utilized to determine whether confusion may be caused. Preferably, the parameters can be easily modifiable by an operator in a manner which is conventional in software programs. Default values for the parameters may be preset according to resources known to those of ordinary skill in the art, such as Soundex for determining whether the codes are phonetically similar.

In another embodiment of the invention, CPU 200 immediately truncates a received N-number, stores both the full N-number and the truncated alphanumeric code in RAM 210B, and compares the truncated alphanumeric code obtained with every other truncated alphanumeric code previously obtained and stored in RAM 210B in a like manner. If the truncated code is not substantially similar to any one of the other codes stored in RAM 210B, then it is immediately combined with the corresponding position data for the same aircraft and the truncated code is displayed at an appropriate location on display 290 in the conventional manner. If however the truncated code is substantially similar to one of the other codes stored in RAM 210B, then it may be either first transformed and displayed at the location on display 290 with a special attribute which indicates to the air traffic controller that the code is similar to another code or the full N-number will be displayed.

As an alternative, if it is determined that two truncated codes are confusingly similar, then the most recently added truncated code may be modified in order to have any number of different display attributes which will distinguish the code from other displayed truncated codes when it is combined with its corresponding position data for the aircraft and displayed at an appropriate location on display 290. Examples of such attributes are a change in color, a change in intensity (i.e., brighter), flashing for a predetermined length of time, flashing until disabled by the operator, etc. If however the truncated code is substantially similar to one of the other codes stored in RAM 210B, then it is instead transformed and displayed at the location on display 290 with a special attribute which indicates to the air traffic controller that the code is similar to another code.

Also, instead of merely modifying the truncated code when it is confusingly similar to another code, ground computer 130 can supplement it with the characters dropped from the full original alphanumeric data so that the full original alphanumeric data is displayed, with the part constituting the truncated code modified so as to have contrasting color or a different brightness. In addition to the most recently added truncated code, the ground computer 130 may also modify, supplement, restore, etc., the display of the truncated code which has been determined to be confusingly similar to the most recently added truncated code. Therefore, if a controller adds a new aircraft and conflict or confusion exists with an earlier craft, the N-numbers of both aircraft will be modified in the same manner.

Figure 5:
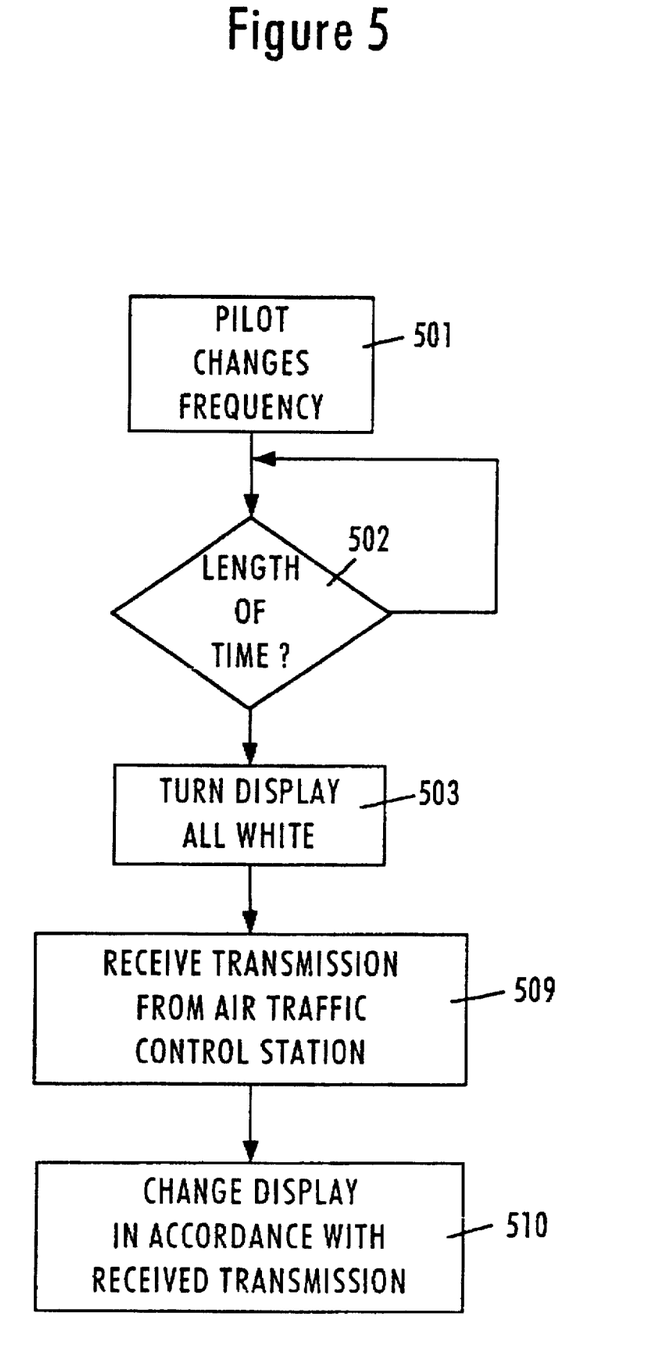
FIG. 5 is a flowchart of the air traffic control method in accordance from the perspective of an aircraft pilot in a preferred embodiment of the present invention.

In addition, the communication link of the control of the two displays must be bidirectional so that the air traffic control system is able to provide other information in the direction from aircraft to air control station 120. This information can be used to, for example, automatically indicate the radio frequency channel being used for verbal communication. Consequently, when the pilot switches the radio frequency, the transponder or transceiver in the aircraft will transmit information signals indicating the change to the air control station 120 and the display at both locations will be modified accordingly (i.e., to the same color) at substantially the same time so that the alphanumeric display in the aircraft matches the alphanumeric display at air control station 120. An example of an air traffic control method from the perspective of the aircraft is shown in FIG. 5.

The ability to have the correct radio frequency and a display in the aircraft matching the display at the air control station is important in situations such as flight following, where successive air control stations pass an aircraft off from one air control station to the next by verbally indicating to the pilot the frequency of the next control station before terminating communications. If the verbal indication is incorrect or if there is not a clean pass off, then a loss of communication will result and the known problems of whether to use the full or truncated N-number will occur. In step 501 of FIG. 5, the pilot is handed off to a new air traffic control station and changes frequency. Immediately upon the change in frequency, all characters of the N-number displayed on the pilot's display 290' and the display 290 of the air traffic control station turn all white (step 503). Preferably the change in frequency is timed so that the display turns white only after the frequency change has lasted for a predetermined length of time (step 502). When radio contact is made and the air traffic controller touches the screen of display 290 (step 305), the transceiver 230 or other elements of the aircraft receives the transmission from air traffic control station 120 containing information changing the color or other attributes of the characters to be displayed on display 290' (step 509). When received, the information signals are immediately processed by CPU 200 and forwarded to display 290' via display interface 275' to display the N-number in the manner indicated by the information signals contained in the transmission (step 510). In a system according to the present invention, communication can be established automatically by a telemetry channel through the transponder and the pilot will know the status of the air traffic controller's display because the display in the aircraft will be controlled to be the same in the manner discussed above.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

What is claimed:

1. An air traffic control system, comprising:
    a receiver configured to receive first and second aircraft identification information signals representing respective first and second groups of alphanumeric characters corresponding to first and second aircraft, said second aircraft identification information signal being received subsequent to said first aircraft identification information signal; and
    a processor configured to process said first aircraft identification information signal into a first code signal representing a first alphanumeric code and said second aircraft identification information signal into a second code signal representing a second alphanumeric code, to determine whether said second alphanumeric code exceeds a specified degree of similarity to said first alphanumeric code, and to generate, as an output signal, either said second code signal if said second alphanumeric code does not exceed said specified degree of similarity to said first alphanumeric code or said second aircraft identification information signal if said second alphanumeric code exceeds said specified degree of similarity.

2. A system according to claim 1, wherein said system further comprises an operator display configured to display said first group of alphanumeric characters and the alphanumeric characters represented by said output signal.

3. A system according to claim 2, wherein said receiver is configured to further receive first and second aircraft position information signals respectively representing positions of said first and second aircrafts, said processor is configured to process said first and second aircraft position information signals and to generate first and second output signals indicative of the relative positions of said first and second aircrafts, and said display is configured to display said first group of alphanumeric characters at or near the relative position of said first aircraft and the alphanumeric characters represented by said output signal at or near the relative position of said second aircraft.

4. A system according to claim 3, wherein said display comprises a touch screen display and, when an operator touches the screen at a location at which said second group of alphanumeric characters is displayed, said processor processes said second aircraft identification information signal into a second code signal representing a second alphanumeric code, determines whether said second alphanumeric code exceeds a specified degree of similarity to said first alphanumeric code and generates said output signal at the relative position of said second aircraft.

5. A system according to claim 4, wherein said second group of alphanumerics is displayed in a first color before the operator touches the screen and, after the operator touches the screen, said alphanumeric characters represented by the output signal is displayed in a second color different than the first color.

6. A system according to claim 5, wherein when an operator touches the screen at a location at which said second group of alphanumeric characters is displayed, said processor also processes said first aircraft identification information signal into a first code signal representing a first alphanumeric code, and if said second alphanumeric code exceeds a specified degree of similarity to said first alphanumeric code, said first alphanumeric code is also displayed in said second color.

7. A system according to claim 2, wherein when said processor processes said second aircraft identification information signal into a second code signal representing a second alphanumeric code and determines that said second alphanumeric code exceeds a specified degree of similarity to said first alphanumeric code, the first group of alphanumeric characters and the alphanumeric characters represented by said output signal flash for a predetermined period of time.

8. A system according to claim 1, wherein said first and second alphanumeric codes consist of the alphanumeric characters located at predetermined positions in the first and second groups of alphanumeric characters.

9. A system according to claim 8, further comprises a display configured to display, if the second alphanumeric code does not exceed a specified degree of similarity to said first alphanumeric code, only the alphanumeric characters located at the predetermined positions in the first and second groups are displayed.

10. A system according to claim 8, further comprises a display configured to display, if the second alphanumeric code exceeds a specified degree of similarity to said first alphanumeric code, the alphanumeric characters located at the predetermined positions in the first and second groups at a higher intensity than the alphanumeric characters located at other positions.

11. A system according to claim 1, wherein the processor determines if the second alphanumeric code has any one of a sequential similarity, a dyslexic similarity and a phonetic similarity with the first alphanumeric code to a specified degree.

12. A system according to claim 2, wherein the system further comprises a transponder and an alphanumeric display located in the first or second aircraft and wherein said alphanumeric display is changed in conjunction with the operator display.

13. A system according to claim 12, wherein data for controlling the alphanumeric display is transmitted to the alphanumeric display via the transponder.

14. A system according to claim 13, wherein the operator display and the alphanumeric display are changed if the transponder frequency is changed.

15. A method for controlling air traffic comprising the steps of:
    receiving first and second aircraft identification information signals representing respective first and second groups of alphanumeric characters corresponding to first and second aircraft, said second aircraft identification information signal being received subsequent to said first aircraft identification information signal;
    processing said first aircraft identification information signal into a first code signal representing a first alphanumeric code and said second aircraft identification information signal into a second code signal representing a second alphanumeric code;
    determining whether said second alphanumeric code exceeds a specified degree of similarity to said first alphanumeric code, and
    generating as an output signal, either said second code signal if said second alphanumeric code does not exceed a specified degree of similarity to said first alphanumeric code or said second aircraft identification information signal if said second alphanumeric code is substantially similar to said first alphanumeric code.

16. A method according to claim 15, wherein said method further comprises the step of displaying said first group of alphanumeric characters and the alphanumeric characters represented by said output signal on an operator display.

17. A method according to claim 16, comprising the further steps of receiving first and second aircraft position information signals respectively representing positions of said first and second aircrafts, processing said first and second aircraft position information signals, generating first and second output signals indicative of the relative positions of said first and second aircrafts, and displaying said first group of alphanumeric characters at or near the relative position of said first aircraft and the alphanumeric characters represented by said output signal at or near the relative position of said second aircraft.

18. A method according to claim 17, wherein, when an operator touches the display screen at a location at which said second group of alphanumeric characters is displayed, a processor processes said second aircraft identification information signal into a second code signal representing a second alphanumeric code, determines whether said second alphanumeric code exceeds a specified degree of similarity to said first alphanumeric code and generates said output signal at the relative position of said second aircraft.

19. A method according to claim 18, wherein said second group of alphanumerics is displayed in a first color before the operator touches the screen and, after the operator touches the screen, said alphanumeric characters represented by the output signal is displayed in a second color different than the first color.

20. A method according to claim 19, wherein when an operator touches the screen at a location at which said second group of alphanumeric characters is displayed, said processor also processes said first aircraft identification information signal into a first code signal representing a first alphanumeric code, and if said second alphanumeric code exceeds a specified degree of similarity to said first alphanumeric code, said first alphanumeric code is also displayed in said second color.

21. A method according to claim 16, wherein when said second aircraft identification information signal is processed into a second code signal representing a second alphanumeric code and said second alphanumeric code exceeds a specified degree of similarity to said first alphanumeric code, the first group of alphanumeric characters and the alphanumeric characters represented by said output signal flash on the display for a predetermined period of time.

22. A method according to claim 15, wherein said first and second alphanumeric codes consist of the alphanumeric characters located at predetermined positions in the first and second groups of alphanumeric characters.

23. A method according to claim 22, wherein if the second alphanumeric code does not exceed a specified degree of similarity to said first alphanumeric code, only the alphanumeric characters located at the predetermined positions in the first and second groups are displayed.

24. A method according to claim 22, wherein if the second alphanumeric code exceeds a specified degree of similarity to said first alphanumeric code, the alphanumeric characters located at the predetermined positions in the first and second groups are displayed at a higher intensity than the alphanumeric characters located at other positions.

25. A method according to claim 15, wherein the step of determining comprises determining if the second alphanumeric code has any one of a sequential similarity, a dyslexic similarity and a phonetic similarity with the first alphanumeric code to a specified degree.

26. A method according to claim 16, further comprising the step of changing an alphanumeric display located in the first or second aircraft in conjunction with the operator display.

27. A method according to claim 26, comprising the further step of transmitting data for controlling the alphanumeric display via the transponder.

28. A method according to claim 27, comprising the step of changing the operator display and the alphanumeric display if the transponder frequency is changed.

29. An article of manufacture for controlling aircraft N-numbers, comprising:

a computer readable storage medium; and computer programming stored on said storage medium;

wherein said stored computer programming is configured to cause said computer to operate to:

detect first and second groups of alphanumeric characters respectively identifying said first and second aircraft from received first and second aircraft identification information signals;

compute first and second alphanumeric codes corresponding to said first and second groups of alphanumeric characters;

compare said first alphanumeric code with said second alphanumeric code to determine whether said first and second alphanumeric codes exceed a specified degree of similarity; and generate, as an output signal, either said second alphanumeric code if it does not exceed a specified degree of similarity to said first alphanumeric code or said second aircraft identification information signal if said second alphanumeric code exceeds said specified degree of similarity to said first alphanumeric code.

30. An article of manufacture according to claim 29, wherein said stored computer programming is configured to be readable from said computer readable storage medium by the computer to thereby cause said computer to operate so as to:

process said second aircraft identification information signal into a second code signal representing a second alphanumeric code, determine whether said second alphanumeric code exceeds a specified degree of similarity to said first alphanumeric code and generate said output signal at the relative position of said second aircraft in response to an operator touching a touch screen display at a location at which said second group of alphanumeric characters is displayed.

31. An article of manufacture according to claim 29, wherein said stored computer programming is configured to be readable from said computer readable storage medium by the computer to thereby cause said computer to operate so as to:

determine if the second alphanumeric code has any one of a sequential similarity, a dyslexic similarity and a phonetic similarity with the first alphanumeric code to a specified degree.

32. A programmed control system for controlling aircraft N-numbers, comprising:

a processor configured to (i) process a first aircraft identification information signal representing the N-number of a first aircraft into a first code signal representing a first N-number code and a second aircraft identification information signal representing the N-number of a second aircraft into a second code signal representing a second N-number code, (ii) determine whether said second N-number code exceeds a specified degree of similarity to said first N-number code, and (iii) generate, as an output signal, either said second code signal if said second N-number code does not exceed a specified degree of similarity to said first N-number code or said second aircraft identification information signal if said second N-number code exceeds said specified degree of similarity to said first N-number code;

a storage medium configured to store information corresponding to said first and second N-numbers and N-number codes; and a transmitter configured to transmit the output signal to said second aircraft.

33. A programmed control system according to claim 32, wherein:

said processor is configured to determine if the second alphanumeric code has any one of a sequential similarity, a dyslexic similarity and a phonetic similarity with the first alphanumeric code to a specified degree.

34. A control system for controlling aircraft N-numbers comprising one or more aircraft each equipped with:

a. an alphanumeric color display for displaying the N-number of the aircraft with different display attributes, and b. a transponder for transmitting information on a selected radio frequency and for receiving information about the display attributes from a centralized control station and providing said information to said alphanumeric color display.

35. The control system according to claim 34 wherein said centralized control station comprises a processor configured to output said information about the display attributes and a transmitter transmitting said information about the display attributes to said one or more aircraft.

* * * * *